(12) United States Patent
Foster et al.

(10) Patent No.: US 10,071,720 B2
(45) Date of Patent: Sep. 11, 2018

(54) TRANSMISSION INTERNAL PTO CLUTCH AND METHOD OF CONTROL

(71) Applicant: ALLISON TRANSMISSION, INC., Indianapolis, IN (US)

(72) Inventors: Michael Foster, Carmel, IN (US); Douglas Burchett, Camby, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 272 days.

(21) Appl. No.: 15/054,548

(22) Filed: Feb. 26, 2016

(65) Prior Publication Data

US 2017/0240159 A1    Aug. 24, 2017

Related U.S. Application Data

(63) Continuation of application No. 15/051,891, filed on Feb. 24, 2016.

(51) Int. Cl.
*B60K 25/06*    (2006.01)
*B60W 10/30*    (2006.01)
(Continued)

(52) U.S. Cl.
CPC ............. *B60W 10/30* (2013.01); *B60K 17/02* (2013.01); *B60K 25/06* (2013.01); *B60W 10/06* (2013.01); *F16D 48/066* (2013.01); *F16H 63/46* (2013.01); *B60K 17/28* (2013.01); *B60W 2510/0216* (2013.01); *B60W 2510/081* (2013.01); *B60W 2510/107* (2013.01); *B60W 2510/30* (2013.01); *B60W 2540/04* (2013.01); *B60W 2710/022* (2013.01); *B60W 2710/0644* (2013.01); *F16D 2500/106* (2013.01);
(Continued)

(58) Field of Classification Search
None
See application file for complete search history.

(56) References Cited

U.S. PATENT DOCUMENTS 6,183,390 B1 * 2/2001 Koga .................. F16H 61/6648
477/37
7,211,013 B2 * 5/2007 Watanabe ........... F16H 61/0021
474/18

(Continued)

FOREIGN PATENT DOCUMENTS

JP        2011079500 A    4/2011

OTHER PUBLICATIONS

Korean Intellectual Property Office; International Search Report and Written Opinion of the International Searching Authority issued in Application No. PCT/US2016/019757; dated Nov. 22, 2016; 15 Pages; Daejeon, Republic of Korea.

*Primary Examiner* — Justin Holmes
(74) *Attorney, Agent, or Firm* — Taft Stettinius & Hollister LLP; Stephen F. Rost

(57) ABSTRACT

A method of selectively controlling a power take-off (PTO) assembly includes positioning a clutch assembly radially between a shaft and a PTO gear, operably controlling the clutch assembly with a controller, and selectively engaging the clutch assembly with the controller. The controller monitors signals received from a plurality of sensors and compares the monitored signals with respective signal thresholds. The clutch assembly is engaged when the compared monitored signals are within the signal thresholds.

20 Claims, 6 Drawing Sheets

(51) Int. Cl.
    *F16H 63/46*       (2006.01)
    *B60K 17/02*       (2006.01)
    *F16D 48/06*       (2006.01)
    *B60W 10/06*     (2006.01)
    *B60K 17/28*       (2006.01)

(52) U.S. Cl.
CPC ................ *F16D 2500/1026* (2013.01); *F16D 2500/10437* (2013.01); *F16D 2500/308* (2013.01); *F16D 2500/3024* (2013.01); *F16D 2500/3067* (2013.01); *F16D 2500/30825* (2013.01); *F16D 2500/314* (2013.01)

(56) References Cited

U.S. PATENT DOCUMENTS

| | | |
|---|---|---|
| 2005/0211528 A1 | 9/2005 | Hou |
| 2006/0157315 A1* | 7/2006 | Kraxner ............... F16D 25/088 |
| | | 192/85.63 |
| 2007/0032342 A1 | 2/2007 | Meyer et al. |
| 2012/0062157 A1* | 3/2012 | Ota ......................... H02P 21/18 |
| | | 318/400.21 |
| 2013/0292195 A1 | 11/2013 | Gibson et al. |
| 2014/0136067 A1* | 5/2014 | Salewski ............... F16D 48/066 |
| | | 701/68 |
| 2014/0142820 A1 | 5/2014 | Pociask et al. |
| 2015/0080156 A1* | 3/2015 | Takahashi ......... F16H 61/66259 |
| | | 474/11 |

* cited by examiner

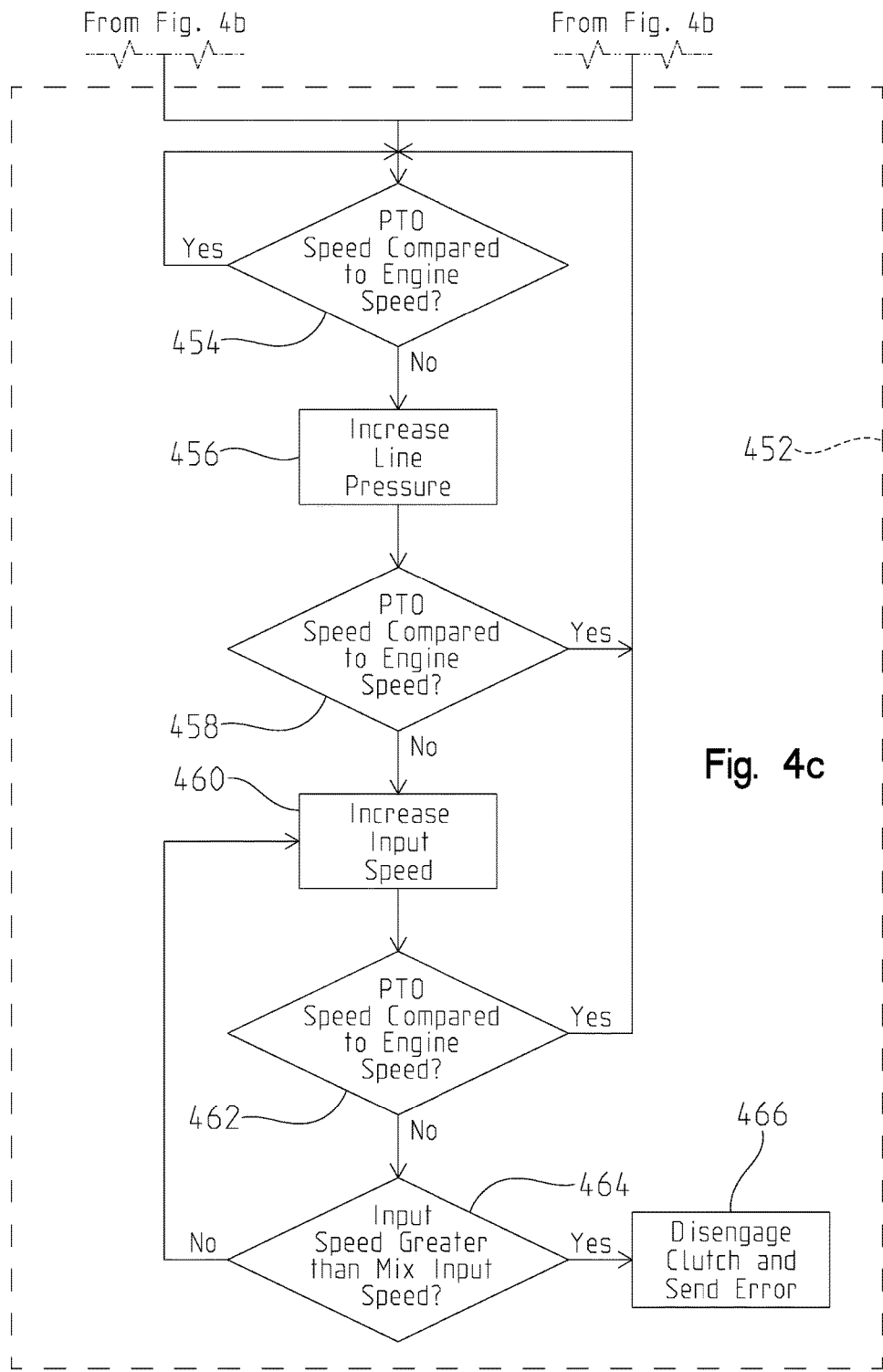

TRANSMISSION INTERNAL PTO CLUTCH AND METHOD OF CONTROL

RELATED APPLICATIONS

The present application is a continuation application of U.S. patent application Ser. No. 15/051,891, filed Feb. 24, 2016, the disclosure of which is hereby incorporated by reference in its entirety.

FIELD OF THE DISCLOSURE

The present disclosure relates to a power take-off (PTO), and in particular to a system and method of selectively engaging the PTO through a clutch in the transmission.

BACKGROUND

Conventional internal combustion engine vehicles can have a PTO that is pivotally coupled to a main driveline shaft between a torque converter and the remaining portions of a transmission assembly. Many PTOs have a PTO gear that mechanically couples the PTO to a secondary assembly such as a pump, compressor, or any other device that can utilize mechanical power provided by a gear. The PTO gear often has a center through-hole that is aligned with, and splined to, the main driveline. In this configuration, the PTO gear will rotate whenever the main driveline rotates.

SUMMARY

In one embodiment of the present disclosure, a PTO drive assembly for a transmission includes a shaft defining a shaft axis; a PTO gear defined radially about the shaft axis; and a clutch assembly positioned between the shaft and the PTO gear and having an engaged position and a disengaged position; wherein, when the clutch assembly is in the engaged position, torque is transferred from the shaft to the PTO gear; and wherein, when the clutch assembly is in the disengage position, torque is not transferred from the shaft to the PTO gear.

In one example of this embodiment, the PTO gear defines an inner face extending axially along the shaft axis, the inner face having a first plurality of splines defined therein. In another example, the shaft defines an outer face extending axially along the shaft axis, the outer face having a second plurality of splines defined therein. In a third example, the clutch assembly includes a first plurality of plates each defining at least one first tang that extends radially away from the shaft axis; a second plurality of plates each defining at least one second tang that extends radially toward the shaft axis; a backing plate spaced axially along the shaft axis on a first side of the plurality of first plates and the plurality of second plates; an apply plate spaced axially along the shaft axis on a second side of the plurality of friction plates and the plurality of reaction plates; and a piston positioned radially about the shaft axis and axially adjacent to the apply plate. In a fourth example, the piston has a thrust bearing positioned between the piston and the apply plate.

In a fifth example, the piston does not rotate with the shaft when the clutch assembly is in either the engaged position or the disengaged position. In a sixth example, the second tangs rotationally couple the second plurality of plates to the second plurality of splines along the outer face of the shaft. In a seventh example, the first plurality splines along the inner surface of the PTO gear are coupled to the first plurality of plates via the at least one first tang. In an eighth example, the piston is rotationally coupled to the PTO gear and the piston rotates as the PTO gear rotates. In a ninth example, the PTO drive assembly includes a hub coupled to the second plurality of splines along a radially inner portion and providing a receiving surface along the radially outer portion of the hub, the receiving surface rotationally coupling the second plurality of plates to the shaft via the at least one second tang. In another example, the first plurality splines along the inner surface of the PTO gear are rotationally coupled to the first plurality of plates via the at least one first tang. In a further example, the PTO gear is pivotally coupled to a transmission case through at least one bearing.

In another embodiment of the present disclosure, a transmission having a PTO drive assembly with an internal clutch includes a transmission housing having a first end and a second end; a torque converter coupled to the housing, the converter configured to receive torque from a drive unit; a shaft disposed in the housing and defining a shaft axis, the shaft coupled at one end to the torque converter; a PTO drive assembly disposed within the housing and including a PTO gear selectively coupled to the shaft; a clutch assembly disposed within the transmission housing between PTO gear and the shaft, the clutch assembly having an engaged position and a disengaged position; and wherein the PTO gear rotates at the same speed as the shaft relative to the transmission housing when the clutch assembly is in the engaged position; and the PTO gear does not rotate at the same speed as the shaft relative to the transmission housing when the clutch assembly is in the disengaged position.

In one example, the transmission includes a gear base disposed along a radially inner portion of the PTO gear; an cylindrical ledge aligned along the shaft axis and spaced radially away from the shaft; and a support disc extending radially from the cylindrical ledge to the gear base and coupling the cylindrical ledge to the gear base; wherein, the cylindrical ledge defines a coupling surface at a radially distal portion from the shaft axis that is pivotally coupled to the transmission case. In a second example, the clutch assembly further comprises a piston assembly, a first cylindrical segment aligned along the shaft axis and radially spaced to be proximate to the gear base; a second cylindrical segment aligned along the shaft axis and radially spaced to provide a gap between the second cylindrical segment and the shaft; and a piston support disc extending radially from the first cylindrical segment to the second cylindrical segment and coupling the first cylindrical segment to the second cylindrical segment; wherein an annular piston cavity is defined between the first cylindrical segment, the second cylindrical segment, and the piston support disc.

In a third example, the support disc also defines a backing plate adapted to resist axially movement along the shaft axis towards the backing plate of one or more clutch discs disposed within the clutch assembly. In a fourth example, the second cylindrical segment defines a coupling surface at a radially distal portion from the shaft axis that is pivotally coupled to the transmission case. In a fifth example, the second cylindrical segment is removably coupled to the gear base with one or more gear base splines. In a sixth example, the transmission includes a piston disposed in the annular disc cavity and movable axially along the shaft axis to transition the clutch assembly between the engaged position and the disengaged position. In a seventh example, the transmission includes at least one hydraulic passageway disposed in the PTO assembly.

In a further embodiment, a transmission system includes a drive unit coupled to an output shaft along a shaft axis, the drive unit adapted to rotatably drive the output shaft; a torque converter pivotally coupled to the output shaft, the torque converter further having a PTO drive shaft coupled thereto; a transmission case pivotally coupled to the torque converter and pivotally coupled to a PTO drive assembly; wherein, the PTO drive assembly includes a PTO gear defined radially about the shaft axis; and a clutch assembly having an engaged position and a disengaged position disposed between the shaft and the PTO gear, where torque is transferred from the shaft to the PTO gear when the clutch assembly is in the engaged position, and torque is not transferred from the shaft to the PTO gear when the clutch assembly is in the disengage position.

In a first example of this embodiment, the PTO gear defines an inner face extending axially along the shaft axis, the inner face having a first plurality of splines defined therein. In a second example, the shaft defines an outer face extending axially along the shaft axis, the outer face having a second plurality of splines defined therein. In a third example, the clutch assembly includes a first plurality of plates each defining at least one first tang that extends radially away from the shaft axis; a second plurality of plates each defining at least one second tang that extends radially toward the shaft axis; a backing plate spaced axially along the shaft axis on a first side of the plurality of first plates and the plurality of second plates; an apply plate spaced axially along the shaft axis on a second side of the plurality of friction plates and the plurality of reaction plates; and a piston positioned radially about the shaft axis and axially adjacent to the apply plate.

In a fourth example, the piston has a thrust bearing positioned between the piston and the apply plate. In a fifth example, the piston does not rotate with the shaft when the clutch assembly is in either the engaged position or the disengaged position. In a sixth example, the second tangs rotationally couple the second plurality of plates to the second plurality of splines along the outer face of the shaft. In a seventh example, the first plurality splines along the inner surface of the PTO gear are rotationally coupled to the first plurality of plates via the at least one first tang. In an eighth example, the piston is rotationally coupled to the PTO gear and the piston rotates as the PTO gear rotates. In a ninth example, the transmission system includes a hub coupled to the second plurality of splines along a radially inner portion and providing a receiving surface along the radially outer portion of the hub, the receiving surface rotationally coupling the second plurality of plates to the shaft via the at least one second tang. In another example, the first plurality splines along the inner surface of the PTO gear are rotationally coupled to the first plurality of plates via the at least one first tang. In a further example, the PTO gear is pivotally coupled to a transmission case through at least one bearing.

In yet a further embodiment of the present disclosure, a method of selectively controlling the engagement of a PTO includes positioning a clutch assembly radially between a shaft and a PTO gear; operably controlling the clutch assembly with a controller; selectively engaging the clutch assembly with the controller; wherein the selectively engaging the clutch assembly step includes monitoring, by the controller, signals received from a plurality of sensors; comparing, by the controller, the monitored signals with respective signal thresholds; and engaging the clutch assembly when the compared monitored signals are within the signal thresholds.

In an alternative embodiment, a method of controlling a PTO assembly of a transmission includes providing a user input, an engine, the transmission including a shaft, a hydraulic system, and fluid within the hydraulic system having a line pressure, a controller including a memory unit and a processor, and the PTO assembly including a PTO gear, a PTO output sensor, and a clutch assembly positioned between the PTO gear and the shaft; determining, by the controller, when a user input has been received; comparing, by the controller, the line pressure of the fluid to a pressure threshold stored in the memory after the user input has been received; engaging the clutch assembly, by the controller, when the line pressure is above the pressure threshold; detecting PTO speed with the PTO output sensor; and comparing, by the controller, an engine speed of the engine to the PTO speed when the clutch assembly is engaged; wherein, if a difference between engine speed and PTO speed is not within a predefined speed threshold value, the controller increases the line pressure.

In another embodiment, a method for controlling a PTO assembly of a transmission includes providing a controller, a user input, a pressure sensor, a valve, a shaft speed sensor, and the PTO assembly including a PTO gear, a PTO speed sensor and a clutch assembly disposed radially between the PTO gear and a shaft of the transmission; receiving, with the controller, a command from the user input indicating a desired engagement of the clutch assembly; comparing a line pressure detected by the pressure sensor to a pressure threshold stored in the controller; controlling the valve, with the controller, to restrict the clutch assembly from engaging the PTO gear when the line pressure is less than the pressure threshold; comparing a PTO speed measured by the PTO speed sensor to a shaft speed measured by the shaft speed sensor with the controller when the clutch assembly is in an engaged position; and disengaging the clutch, with the controller, when the comparing a PTO speed step indicates the PTO speed is not substantially the same as the shaft speed.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 4b is a partial block diagram of a logic flowchart executed by a controller in the control system of FIG. 4a; and FIG. 4c is a continuation of the block diagram of a logic flowchart from FIG. 4b.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
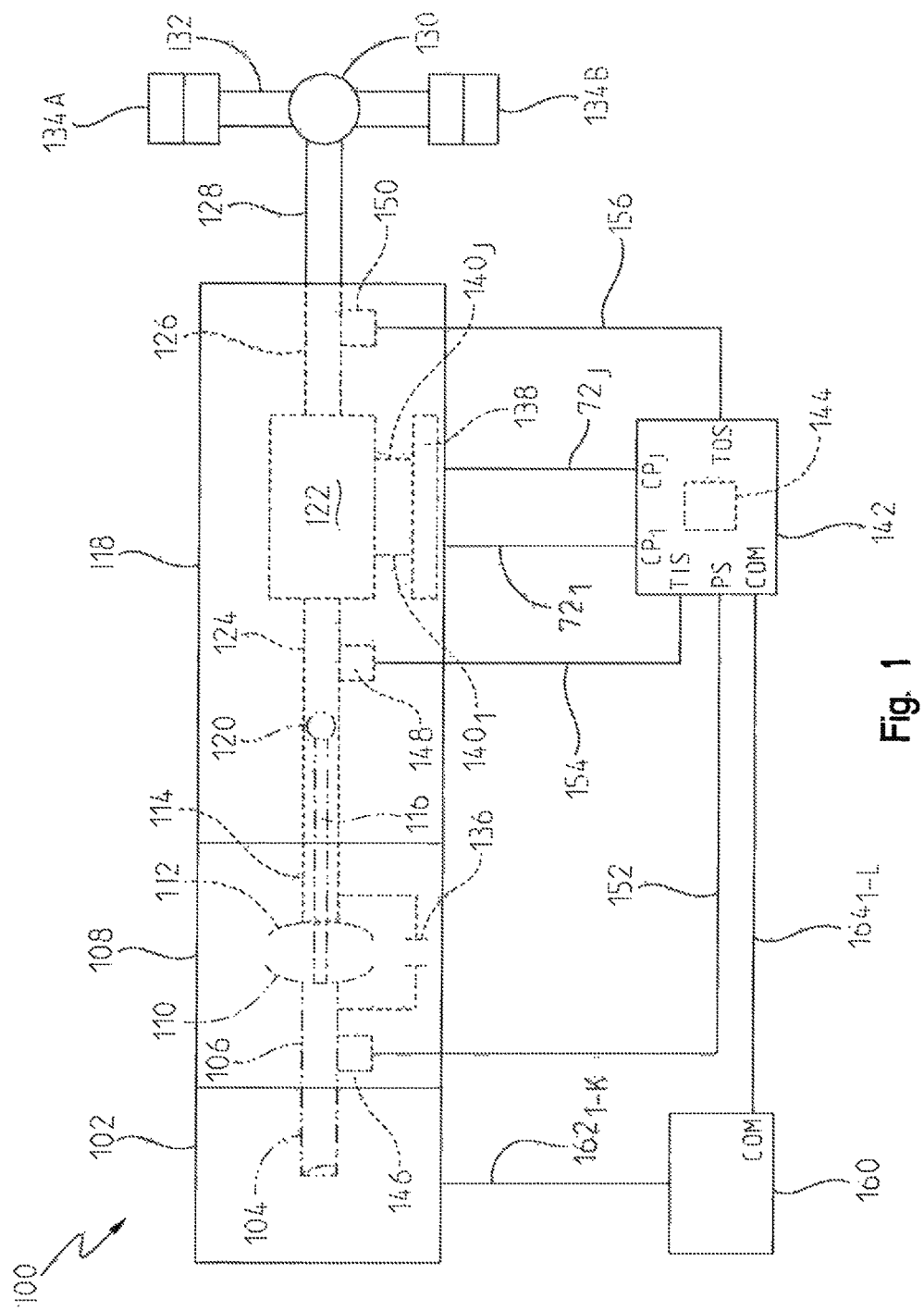
FIG. 1 is an exemplary block diagram and schematic view of one illustrative embodiment of a powered vehicular system.

Referring now to FIG. 1, a block diagram and schematic view of one illustrative embodiment of a vehicular system 100 having a drive unit 102 and transmission 118 is shown. In the illustrated embodiment, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example embodiment, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other embodiments in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated embodiment, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this embodiment, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated embodiment, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one embodiment, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other embodiments in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

Many PTO systems have a clutch or other means for selectively engaging the PTO and the secondary assembly. The clutch is often located between the PTO gear and the secondary assembly and is selectively engageable by the user. The clutch is typically a separate system from the transmission and requires a separate controller and apply an actuator. In this configuration, the clutch often transitions from a disengaged position to an engaged position to mechanically couple the secondary assembly to the PTO gear.

When the clutch is engaged while the driveline is rotating at an excessive speed and the secondary assembly is stationary, the clutch can damage the secondary assembly by the sudden application of torque to the secondary assembly. Further, the clutch may insufficiently engage if the load from the secondary assembly is too great or if insufficient engagement pressure is supplied. When the clutch is insufficiently engaged, it may cause the clutch to fail or otherwise become inoperable. Further, a transmission control module does not always control the clutch. In this configuration, the engagement pressure supplied to the clutch may be either too weak to properly engage the clutch or unnecessarily high, wasting energy in the hydraulic system.

Figure 2:
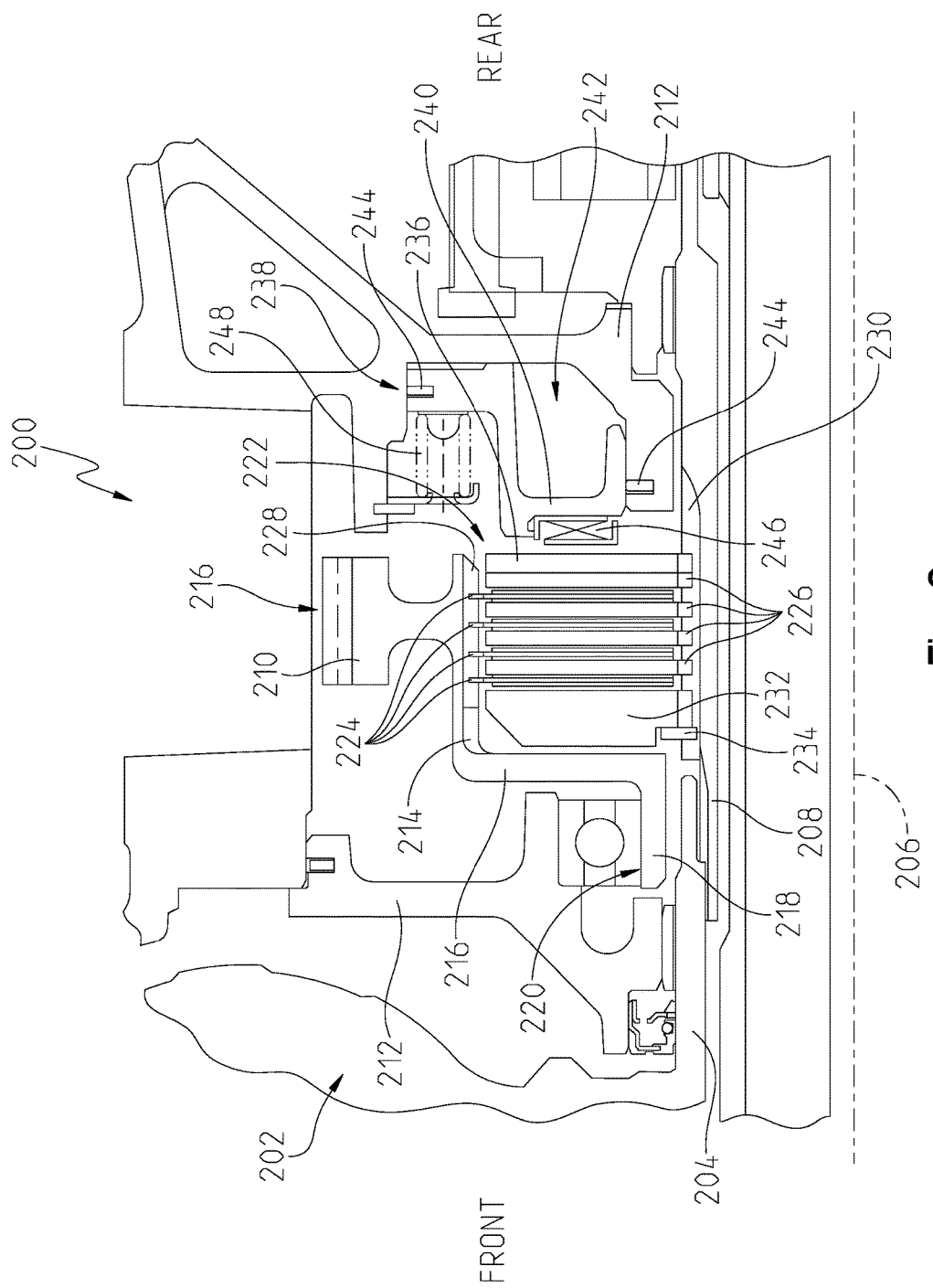
FIG. 2 is a partial cross-sectional view of one embodiment of a transmission with a PTO clutch assembly.

Referring to FIG. 2, one example is shown of a transmission and PTO gear assembly. As described above, a PTO is a device that can redirect a portion of the input power provided by a prime mover (e.g., an engine) to tools, work implements, or accessories for the purpose of performing functions which are secondary to the purpose for the prime mover. For instance, the PTO could provide power to a hydraulic pump. In a hybrid system application, however, power or torque can flow in both directions (i.e., between inputs and outputs, rather than from an input to an output).

In FIG. 2, a torque converter 202 is shown coupled to a pump shaft 204. The torque converter 202 may be configured to transfer torque generated by the drive unit 102 to the pump shaft 204. In one embodiment, the pump shaft 204 may define a shaft axis 206 that extends longitudinally along the pump shaft 204. The pump shaft 204 may further be coupled to a PTO shaft 208 that is defined along the shaft axis 206. The pump shaft 204 and the PTO shaft 208 may be splined to one another. However, in another embodiment the pump shaft 204 and the PTO shaft 208 are one integral component and this disclosure is not limited to any particular shaft configuration.

Also disposed radially about the shaft axis 206 may be a PTO gear 210. The PTO gear 210 may define teeth 216 at a radially distal portion and be pivotally coupled to a transmission case 212. Further, the PTO gear 210 may be able to rotate about the shaft axis 206 relative to the transmission case 212. In one embodiment, the PTO gear 210 may have a gear base 214 defined along a radially inner portion of the PTO gear 210 relative to the teeth 216. The gear base 214 may extend axially along the shaft axis 206 and extend radially inward to define a support disc 216 at a front portion of the PTO gear assembly 200. In the embodiment of FIG. 2, a cylindrical ledge 218 may be spaced about the shaft axis 206 to have a radius slightly greater than the PTO shaft 208. Further, the cylindrical ledge 218 may extend axially along the shaft axis 206 towards the front to define a coupling surface 220 along a radially outer portion of the cylindrical ledge 218. In one nonexclusive embodiment, the rear portion of the cylindrical ledge 218 may be coupled to, or integrally formed with, the support disc 216.

The PTO gear 210 may be pivotally coupled about the shaft axis 206 by the gear base 214, the support disc 216, and the cylindrical ledge 218. More specifically, a bearing or other friction-reducing coupling means could be positioned between the coupling surface 220 of the cylindrical ledge 218 and the transmission case 212. In this embodiment, the PTO gear 210 may rotate relative the transmission case 212 with the coupling means between the cylindrical ledge 218 and the transmission case 212. Further, in one aspect of this embodiment, the cylindrical ledge 218 may not substantially contact the pump shaft 204 and/or the PTO shaft 208. Accordingly, the pump shaft 204 and/or the PTO shaft 208 may also rotate independently of the PTO gear 210.

In one aspect of the embodiment shown in FIG. 2, a PTO clutch assembly 200 is shown with a plurality of plates 222 partially disposed radially between the shaft 208 and the PTO gear 210. More specifically, a first plurality of plates 224 and a second plurality of plates 226 may be axially aligned with the gear base 214.

In one non-limiting aspect of this embodiment, the first plurality of plates 224 may have at least a first tang (not particularly shown) extending radially away from the shaft axis 206. The first tang may be sized to correspond with one or more first spline defined in a radially inner face 228 of the gear base 214. More specifically, the first spline may allow the first tang, and in turn the first plurality of plates 224, to be rotationally coupled to the inner face 228 of the gear base 214. Further, the spline may extend axially along the inner face 228 to allow at least some axial movement of the first tang along the shaft axis 206 while being positing therein.

Similarly, the second plurality of plates 226 may have at least a second tang (not particularly shown) extending radially inward towards the shaft axis 206. The second tang may be sized to correspond with one or more second spline defined in an outer face 230 of the PTO shaft 208. More specifically, the second spline may allow the second tang, and in turn the second plurality of plates 224, to be rotationally coupled to the outer face 230 of the PTO shaft 208 while allowing at least some axial movement along the shaft axis 206.

A backing plate 232 may also be coupled to the second spline of the outer face 230. The backing plate 232 may have a radial stop 234 coupled to the PTO shaft 208 to define the forward most axial location of the backing plate 232 relative to the PTO shaft 208 along the shaft axis 206. The backing plate 232 may be sufficiently sized to resist axial forces applied along the shaft axis 206 towards the front without substantially deflecting. In one embodiment described in more detail below, an axial force may be applied to the first and second plurality of plates 224, 226 in the forward direction by a piston 240. In this embodiment, the backing plate 232 may substantially resist the axial force applied by the piston 240 through the plurality of plates 222 to restrict any further axial movement along the shaft axis 206.

A piston assembly 238 may also be disposed radially about the shaft axis 206 to selectively apply an axial force along the shaft axis 206. The piston assembly 238 may be partially defined as an annular piston cavity 242 in the transmission case 212. The piston cavity 242 may partially encompass the piston 240 to allow the piston 240 to slide axially along the shaft axis 206. More specifically, the piston 240 may be positioned both radially and axially along the shaft axis 206 to align proximate to the plurality of plates 222. Further, between the piston 240 and the plurality of plates 222 may be an apply plate 236. The apply plate may also be coupled to the second spline of the outer face 230 and capable of moving axially along the shaft axis 206.

The piston cavity 242 may be fluidly coupled to a fluid passageway (not particularly shown) defined in the transmission case 212. In one non-limiting example, the fluid passageway to the piston cavity 242 may be one of the fluid passageways $140_1$-$140_j$ described above for FIG. 1. The piston cavity 242 may also be fluidly sealed relative to the surrounding transmission case 212 by one or more fluid seals 244. Further, the fluid passageway may be fluidly couple to one or more valves that may selectively direct pressurized fluid through the fluid passageway and into the piston cavity 242, thereby moving the piston 240 in the forward direction.

Between the piston 240 and the apply plate 236 may be a thrust bearing 246. In one embodiment, the thrust bearing allows the piston 240 to provide an axial force in the forward direction without substantially restricting the rotation of the apply plate 236. In this embodiment the piston 240 may be mounted to the transmission case 212 and thereby substantially restricted from rotating with the PTO shaft 208. However, the apply plate 236 is splined to the PTO shaft 208 as described in more detail above. Accordingly, the PTO shaft 208 may rotate relative to the piston 240. The thrust bearing 246 may allow the relatively stationary piston 240 to provide an axial force to the rotating apply plate 236 without substantially restricting the rotation of the apply plate 236.

A piston spring 248 may also affect the axial alignment of the piston 240. More specifically, the piston spring 248 may be coupled to the piston 240 to provide a rearward force on the piston 240. In this embodiment, when there is insufficient fluid pressure provided to the piston cavity 242, the piston spring 248 may force the piston 240 in the rearward direction along the shaft axis 206. However, if sufficient fluid pressure is provided into the piston cavity 242, the piston 240 may overcome the force provided by the piston spring 248 and move axially in the forward direction. In one non-limiting example the piston spring 248 can be any know mechanical spring such as one or more coil spring, Belleville spring, leaf spring, torsion spring or the any other similar mechanical springing system.

In one non-exclusive embodiment the first plurality of plates 224 may have a frictional material disposed thereon and the second plurality of plates 226 may be composed of a material to react with the frictional material. In this embodiment the first and second plurality of plates 224, 226 may substantially lock to one another when a sufficient axial force presses them together. Accordingly, when pressurized fluid is introduced into the piston cavity 242, the piston 240 begins to press the thrust bearing 246 against the apply plate 236 and the first and second plurality of plates 224, 226 may be forced together between the apply plate 236 and the backing plate 232. Further, the first and second plurality of plates 224, 226 may be pressed together with sufficient force to substantially transfer the torque of the PTO shaft 208 to the PTO gear 210.

The embodiment of FIG. 2 may be configured to selectively couple the PTO gear 210 to the shaft 208 as described above. More specifically, when insufficient fluid pressure is provided to the piston cavity 242, the piston spring 248 may force the piston 240 in the rearward direction, thereby allowing the first plurality of plates 224 to rotate independently of the second plurality of plates 226. In this configuration, the PTO gear 210 may not rotate when the PTO shaft 208 rotates.

Alternatively, when sufficient fluid pressure is provided to the piston cavity 242, the opposing force of the piston spring 248 may be overcome and the piston 240 may move axially in the forward direction, thereby substantially coupling the first plurality of plates 224 to the second plurality of plates 226. In this configuration, the PTO gear 210 may rotate when the PTO shaft 208 rotates.

Figure 3:
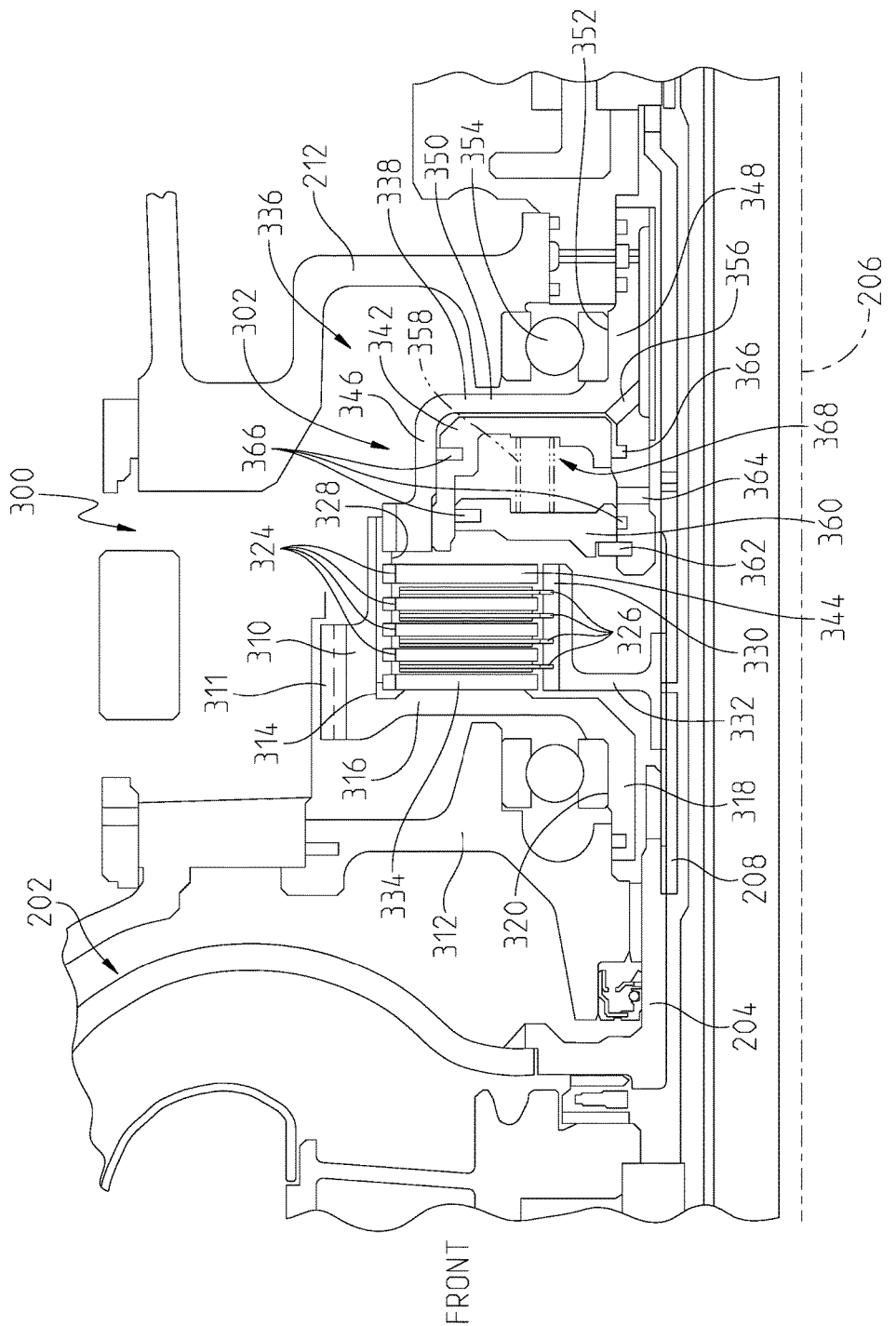
FIG. 3 is a partial cross-sectional view of another embodiment of a transmission with a PTO clutch assembly.

Referring now to FIG. 3, another PTO clutch assembly 300 is shown. More specifically, a rotating clutch assembly 302 is shown in FIG. 3. This embodiment may also have a PTO gear 310 disposed radially about the shaft axis 206. The PTO gear 310 may define teeth 311 at a radially distal portion and be pivotally coupled to a transmission case 312. Further, the PTO gear 310 may be able to rotate about the shaft axis 206 relative to the transmission case 212. In one embodiment, the PTO gear 310 may have a gear base 314 defined along a radially inner portion of the PTO gear 310. The gear base 314 may extend axially along the shaft axis 206. A support disc 316 may be coupled to, or integrally formed with, the gear base 314 at a front portion and extend radially inward towards a cylindrical ledge 318. The cylindrical ledge 318 may be spaced about the shaft axis 206 to have a radius slightly greater than the pump shaft 204 and/or the PTO shaft 208. Further, the cylindrical ledge 318 may extend axially along the shaft axis 206 in the forward direction to define a coupling surface 320 along a radially outer portion of the cylindrical ledge 318. In one nonexclusive embodiment, a rear portion of the cylindrical ledge 318 may be coupled to, or integrally formed with, the support disc 316.

The PTO gear 310 of FIG. 3 may be pivotally coupled about the shaft axis 206 by the gear base 314, the support disc 316, and the cylindrical ledge 318 in substantially the same way as the PTO gear 210 of FIG. 2. Accordingly, the similarities between the two embodiments are not discussed in detail but rather incorporated as applicable for this embodiment as well.

In one aspect of the embodiment shown in FIG. 3, the clutch assembly 302 may be partially disposed radially between the PTO shaft 208 and the PTO gear 310. More specifically, a first plurality of plates 324 and a second plurality of plates 326 may be axially aligned with the gear base 314. Further the first and second plurality of plates 324, 326 may be radially disposed about the shaft 208.

In one non-limiting aspect of this embodiment, the first plurality of plates 324 may have at least a third tang (not particularly shown) extending radially away from the shaft axis 206. The third tang may be sized to correspond with one or more third spline defined in an inner face 328 of the gear base 314. More specifically, the third spline may allow the third tang, and in turn the first plurality of plates 324, to be rotationally coupled to the inner face 328 of the gear base 314 while allowing at least some axial movement along the shaft axis 206.

Similarly, the second plurality of plates 326 may have at least a fourth tang (not particularly shown) extending radially towards the shaft axis 206. The fourth tang may be sized to correspond with one or more fourth spline defined in a receiving surface 330 of a hub 332 disposed between the PTO shaft 208 and the first and second plurality of plates 324, 326. More specifically, the hub 332 may have splines along a radially inner portion that correspond with splines on a radially outer portion of the PTO shaft 208. Further, the hub may extend radially away from the shaft axis 206 to define the receiving surface 330. In other words, the hub 332 may be a radial spacer for the receiving surface 330, allowing the second plurality of plates 326 to be coupled to the receiving surface 330 at a radially outer portion relative to the PTO shaft 208 surface. Further, the fourth spline may allow the fourth tang, and in turn the second plurality of plates 326, to be rotationally coupled to the receiving surface 330 of the hub 332 while allowing at least some axial movement along the shaft axis 206.

A backing plate 334 may also be coupled to the inner face 328 of the gear base 314. The backing plate 334 may have a forward most axial location along the shaft axis 206 where a portion of the support disc 316 substantially restricts any further axial movement of the backing plate 334 in the forward direction. Further, the support disc 316 and the backing plate 334 may be sufficiently sized to resist axial forces applied along the shaft axis 206 towards the front direction without substantially deflecting.

One embodiment of the rotating clutch assembly 302 may include a rotating piston assembly 336 disposed radially about the shaft axis 206. The rotating piston assembly 336 may have a housing 338 that further defines an annular piston cavity therein. The housing 338 may have a first cylindrical segment 346 and a second cylindrical segment 348 radially offset from one another about the shaft axis 206. The first and second cylindrical sections 346, 348 may be coupled to one another with, or integrally formed through, a piston support disc 350 that extends radially between the first and second cylindrical sections 346, 348. In one nonexclusive example, the second cylindrical segment 348 may define a coupling surface 352 along a radially distal portion of the second cylindrical segment 348. The coupling surface 352 may be a location to pivotally couple the rotating piston assembly 336 to the transmission case 212. In one nonexclusive embodiment, a bearing 354 or other similar structure may be positioned between the coupling surface 352 and the transmission case 212 to allow the rotating piston assembly 336 to more easily rotate relative to the transmission case 212.

In yet another aspect of this embodiment, the first cylindrical segment 346 may extend axially along the shaft axis 206 to at least partially contact a portion of the gear base 314 of the PTO gear 310. Further, the first cylindrical segment 346 may be coupled to the gear base 314 so the PTO gear 310 and the rotating piston assembly 336 are substantially coupled to one another. In one non-limiting example, the first cylindrical segment 346 may be coupled to the gear base 314 through splines. However, the first cylindrical segment 346 may be coupled to the gear base 314 using a plurality of different coupling methods including welds, rivets, bolts, adhesives, clamping mechanisms, and/or any other similar coupling mechanisms. Accordingly, this disclosure is not limited to any particular coupling mechanism.

In the embodiment shown in FIG. 3, the PTO gear 310 and the rotating piston assembly 336 may rotate as substantially one assembly relative to the transmission case 212. Further, the PTO gear 310 and the piston assembly 336 may rotate with the PTO shaft 208 when the PTO clutch assembly 300 is in the engaged position. Alternatively, the PTO gear 310 and the piston assembly 336 may rotate independently of the PTO shaft 208 when the PTO clutch assembly 300 is in the disengaged position.

The annular piston cavity may partially encompass a piston 342 that is slidably coupled thereto. More specifically, the piston 342 may be positioned both radially and axially about the shaft axis 206 to align proximate to the first and second plurality of plates 324, 326. Further, between the piston 342 and the first and second plurality of plates 324, 326 may be an apply plate 344. The apply plate 344 may be coupled to the third spline of the inner face 328 and capable of moving axially along the shaft axis 206.

The piston 342 may selectively move axially along the shaft axis 206 in the forward direction. More specifically, a piston cavity (not specifically shown in FIG. 3) may be fluidly coupled to a fluid passageway 356 defined in the transmission case 212. The piston cavity may also be fluidly sealed relative to the surrounding transmission case 212 by one or more fluid seals 366. Further, the fluid passageway 356 may be fluidly coupled to one or more valves of the transmission. The one or more valves may selectively direct pressurized fluid through the fluid passageway 356 and into the piston cavity, thereby moving the piston 342 in the forward direction. In one embodiment, the fluid passageway 356 may be part of the one or more corresponding fluid passageways $140_1$-$140_J$ described above.

A piston spring 358 may also affect the axial position of the piston 342. More specifically, the piston spring 358 may be coupled to the piston 342 to provide a rearward force on the piston 342. In this embodiment, when there is insufficient fluid pressure provided to the piston cavity, the piston spring 358 may force the piston 342 in the rearward direction along the shaft axis 206. However, if sufficient fluid pressure is provided into the piston cavity, the piston 342 may overcome the force provided by the piston spring 358 and move axially in the forward direction.

The piston spring 358 may be positioned between a piston disc 360 and the piston 342. The piston disc 360 may be fixedly coupled to the second cylindrical segment 348 at axial location proximate to the hub 332. In one embodiment, a lock ring 362 may be positioned along the second cylindrical segment 348 to contact and maintain the piston disc 360 in a specific axial alignment along the shaft axis 206 relative to the transmission case 312. In one embodiment, the piston spring 358 may be a mechanical spring and provide an axial force on the piston 358 in the rearward direction by reacting against the axially fixed piston disc 360. In this embodiment the piston spring 358 can be any know mechanical spring such as one or more coil spring, Belleville spring, leaf spring, torsion spring or the any other similar mechanical springing system.

In an alternative embodiment, the rearward force provided to the piston 342 may be generated through a hydraulic or pneumatic pressure system. More specifically, instead of positioning a mechanical piston spring 358 in the annular piston cavity, one of the plurality of hydraulic passageways may be a piston return passage 364. In this embodiment, the piston disc 360 may have one or more fluid seal 366 disposed at an inner radial surface along the second cylindrical segment 348 and one or more fluid seal 366 disposed at an outer radial surface along a portion of the piston 342. A balance piston cavity 368 may be an annular fluid chamber defined between the piston disc 360, the piston 342, and the second cylindrical segment 348 that only allows substantial fluid transfer through the piston return passage 364. In this embodiment, when pressurized fluid is provided to the balance piston cavity 368 through the piston return passage 364, it may provide a force on the piston 342 towards the rear direction. Accordingly, if the rearward force generated by the pressurized fluid in the balance piston cavity 368 is greater than the forward force generated by the pressurized fluid in the piston cavity, the piston 342 will move axially to the rearmost position. Alternatively, if the pressurized fluid supplied to the piston cavity provides a forward force sufficient to overcome the rearward force generated by the pressurized fluid in the balance piston cavity 368, the piston 342 will move in the forward direction, compressing the first and second plurality of plates 324, 326 between the apply plate 344 and the backing plate 334.

As described in more detail above, the first and second plurality of plates 324, 326 may substantially lock to one another when a sufficient axial force presses them together. Accordingly, when pressurized fluid is introduced into the piston cavity, the piston 342 begins to press against the apply plate 344 and the first and second plurality of plates 324, 326 are forced together between the apply plate 344 and the backing plate 334. Further, the first and second plurality of plates 324, 326 may be pressed together with sufficient force to substantially transfer the torque of the PTO shaft 208, through the hub 332 to the PTO gear 310.

The PTO gear 310 may be selectively couple to the shaft 208 as described above. More specifically, when insufficient fluid pressure is provided to the piston cavity, or when sufficient fluid pressure is supplied to the balance piston cavity 368, the piston 342 may be forced in the rearward direction, thereby allowing the first plurality of plates 324 to rotate independently of the second plurality of plates 326. In this configuration, the PTO gear 310 may not rotate when the PTO shaft 208 rotates.

Alternatively, when sufficient fluid pressure is provided to the piston cavity, the opposing force of the pressurized fluid in the balance piston cavity 368 may be overcome and the piston 342 may move axially in the forward direction. The piston 342 may move sufficiently forward and with enough force to substantially couple the first plurality of plates 324 to the second plurality of plates 326. In this configuration, the PTO gear 310 may rotate when the PTO shaft 208 rotates.

In either the embodiment shown and described for FIG. 2 or FIG. 3, the one set of the plurality of plates 224, 226 or 324, 326 can be clutch friction plates. Clutch friction plates, for example, have been designed with a carbon fiber material and used in the automotive industry in order to prevent transmitting the same uneven torque and input rotation from internal combustion engines which causes torsional activity and damage within vehicle transmissions. As a result, similar carbon fiber friction material may be incorporated into the PTO clutch assembly 200, 300 design described herein. Carbon is just one material example, could be any type of friction material (cellulose papers, bronze, graphitic, etc.).

Figure 4A:
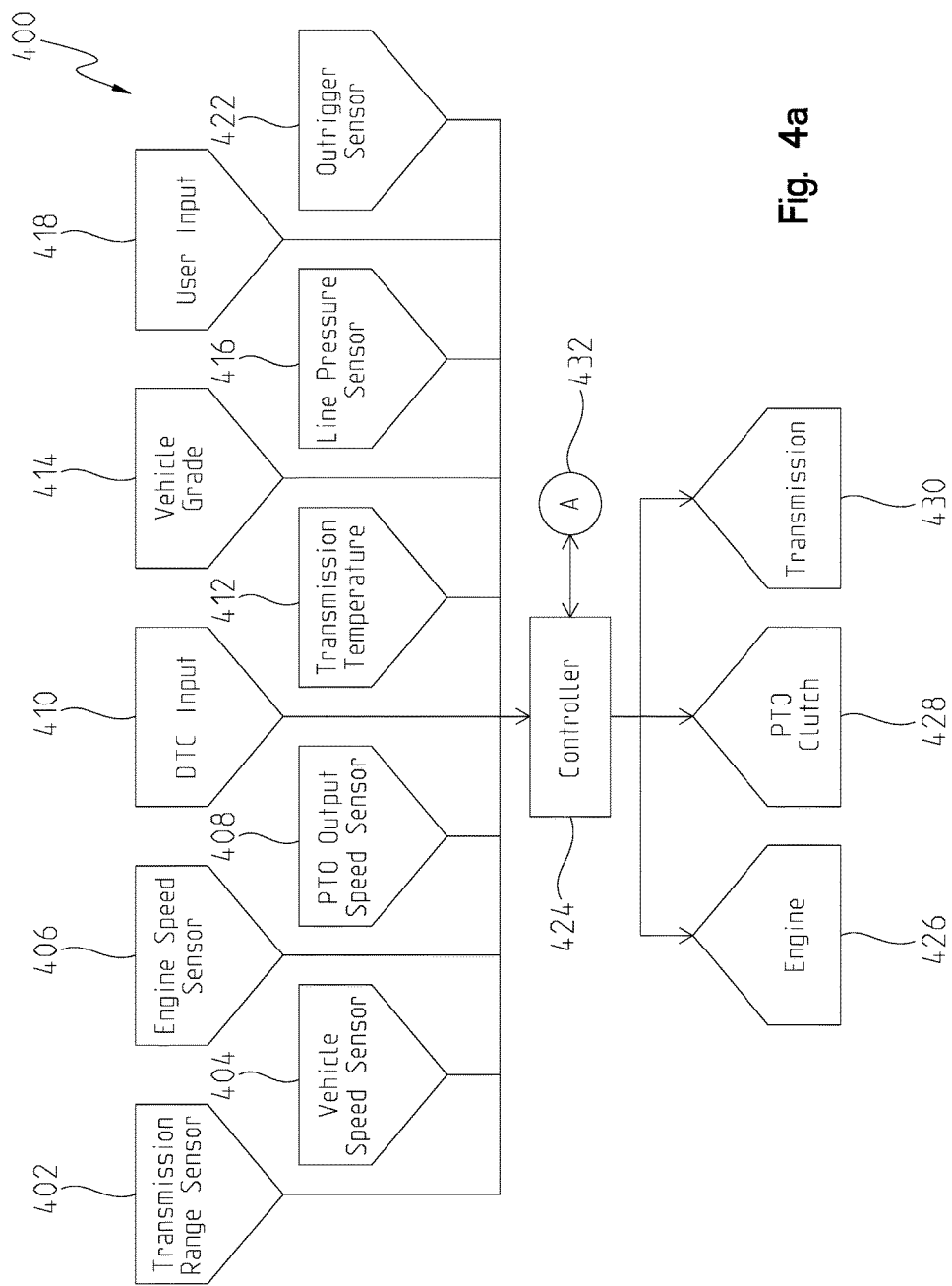
FIG. 4a is a block diagram illustrating some of the components for a control system for a PTO clutch assembly.

Referring now to FIG. 4a, a block diagram 400 illustrates some of the electrical components of the PTO clutch assembly 200, 300 discussed above. In one example, a controller 424 may be in communication with a plurality of different sensors. The controller 424 can include a memory unit for storing a set of instructions that can be executed by a processor. The controller 424 can store torque curves, look-up tables, shift curves, threshold values, and any other algorithms, methods, processes, or set of instructions for controlling the PTO clutch assembly 200, 300. In one embodiment, the controller 424 may be the memory unit 144 from the transmission control circuit 142 described above.

While specific sensors are discussed herein, this disclosure is not limited to the particular sensors discussed. Rather, any number and type of sensors could be used based on the teachings of this disclosure. Further, no particular form of communication between the plurality of sensors and the controller 424 should be limiting. In one embodiment, the controller 424 may communicate with the plurality of sensors through one or more wire harness that electrically couples the controller 424 to the plurality of sensors. In another embodiment, the plurality of sensors may communicate with the controller wirelessly through one or more forms of wireless communication. Further still, the signal paths $72_1$-$72_j$ described above may be used by the controller 424 here as well. Accordingly, the particular form of communication between the plurality of sensors and the controller is not limiting.

In one embodiment, a transmission range sensor 402 may be coupled to the controller 424. The transmission range sensor can provide a signal to the controller 424 indicating the position of a transmission selector. In one embodiment, the transmission range sensor 402 may indicate whether the transmission selector is in a park, reverse, neutral, or drive position. However, in one embodiment there may be no transmission range sensor 402 at all.

A vehicle speed sensor 404 (or speed sensor 150) may also be coupled to the controller 424. The vehicle speed sensor 404 may indicate to the controller 424 the speed of the vehicle at any given time. Further, the controller 424 may also communicate with an engine speed sensor 406 that is coupled thereto. The engine speed sensor 406 may indicate to the controller 424 the speed of an engine 426 (or drive unit 102) which, in turn, indicates the rotational speed of the pump shaft 204 and/or the PTO shaft 208.

In one embodiment, a PTO output speed sensor 408 may be coupled to the controller 424. The PTO output speed sensor 408 may be coupled to the PTO gear 310, 210 and indicate to the controller 424 when the PTO gear 310, 210 is rotating relative to the transmission case 212. Further, the PTO output speed sensor 408 can indicate to the controller 424 the particular rotational speed of the PTO gear 310, 210. In one embodiment, the PTO output sensor may be a Hall effect type, variable reluctance, or other know sensing technology.

The controller 424 may also be coupled to a transmission temperature sensor 412 that sends a signal to the controller 424 indicating the temperature of the fluid within transmission 430. A vehicle grade sensor 414 may also communicate with the controller 424 to identify the inclination of the transmission 430 relative to level. The controller 424 may also receive a signal from at least one line pressure sensor 416 that identifies the hydraulic pressure in at least one respective hydraulic circuit such as the one or more corresponding fluid passageways $140_1$-$140_j$.

The controller 424 can also be in electrical communication with a user input 418 or other operator controls. The user input 418 can include a manual shift selector, for example, that includes a plurality of user controls. The user input 418 can also include a plurality of switches, buttons, levers, joysticks, pedals, etc. One of the plurality of operator controls can include a PTO control button. The operator controls can be disposed in a cab of a vehicle to allow the vehicle operator to manually select one or more of the user control buttons on the user input 418. In particular, the vehicle operator can select the PTO control button to engage the PTO clutch assembly 200, 300. When the user input 418 is triggered to an active or enabled state, a signal is electrically transmitted to the controller 424 to indicate that the operator desires to activate or enable the PTO clutch assembly 200, 300.

In one embodiment, there can be specific circumstances and conditions under which the PTO clutch assembly 200, 300 can be enabled, and the controller 424 can store these conditions in its memory unit. Thus, when the user input 418 is triggered and the controller 424 receives the indicative signal from the user input 418, the controller 424 can determine whether appropriate conditions are satisfied before activating or enabling the PTO clutch assembly 200, 300. Also considered herein as part of the user input 418 is a touch-screen with a graphical user interface, push buttons, and any other known device and method for indicating a user preference to a controller.

In one embodiment, the work machine may have outriggers fitted thereto. In this embodiment, the controller 424 may communicate with an outrigger sensor 422 that indicates the position of the outriggers to the controller 424.

In addition to receiving signals from the plurality of sensors discussed above, the controller 424 may also send a plurality of signals to a plurality of different components throughout the work machine. One nonexclusive example of these components is shown in FIG. 4a. However, the components receiving signals from the controller shown and discussed herein are not limiting, rather they are meant only to be non-limiting examples.

In one embodiment, the controller 424 may send a signal to the engine 426 indicating a desired engine speed. The controller 424 may determine the desired engine speed based on the signals received from the plurality of sensors. In one embodiment, the controller 424 may send a signal to an engine controller (not shown) to increase or decrease the rotational speed of the engine 426. Further, the engine speed may be altered by the controller 424 to generate a desired rotational speed for the PTO clutch assembly 200, 300.

In another embodiment, the controller 424 may send a signal to a PTO clutch signal 428 to the PTO clutch assembly 200, 300 to engage or disengage PTO clutch assembly 200, 300. In this embodiment, the controller may signal a valve (not specifically shown) of the transmission to open or close as directed by the controller 424 to engage or disengage the piston 240, 342 of the respective PTO clutch assembly 200, 300.

The controller 424 may also communicate with the transmission 430 based on the signals monitored by the controller 424. In one embodiment, the controller 424 may be a transmission control module that also controls substantially all of the components in the transmission. In this embodiment, the controller 424 may monitor and control both the PTO clutch 428 and the transmission 430. In a different embodiment, the controller 424 may send signals to a separate transmission control module to control the transmission 430.

In one embodiment, the controller 424 may monitor and control the components described above based on a control algorithm 432. The control algorithm 432 is shown in more detail in FIG. 4b. The control algorithm 432 can include a plurality of blocks that are stored in the memory unit and executed by the processor in the controller 424 for operably controlling the PTO clutch assembly 200, 300. The plurality of blocks illustrated in FIG. 4b is not intended to be limiting, as one different example may include fewer blocks and a second different example may include additional blocks.

Figure 4B:
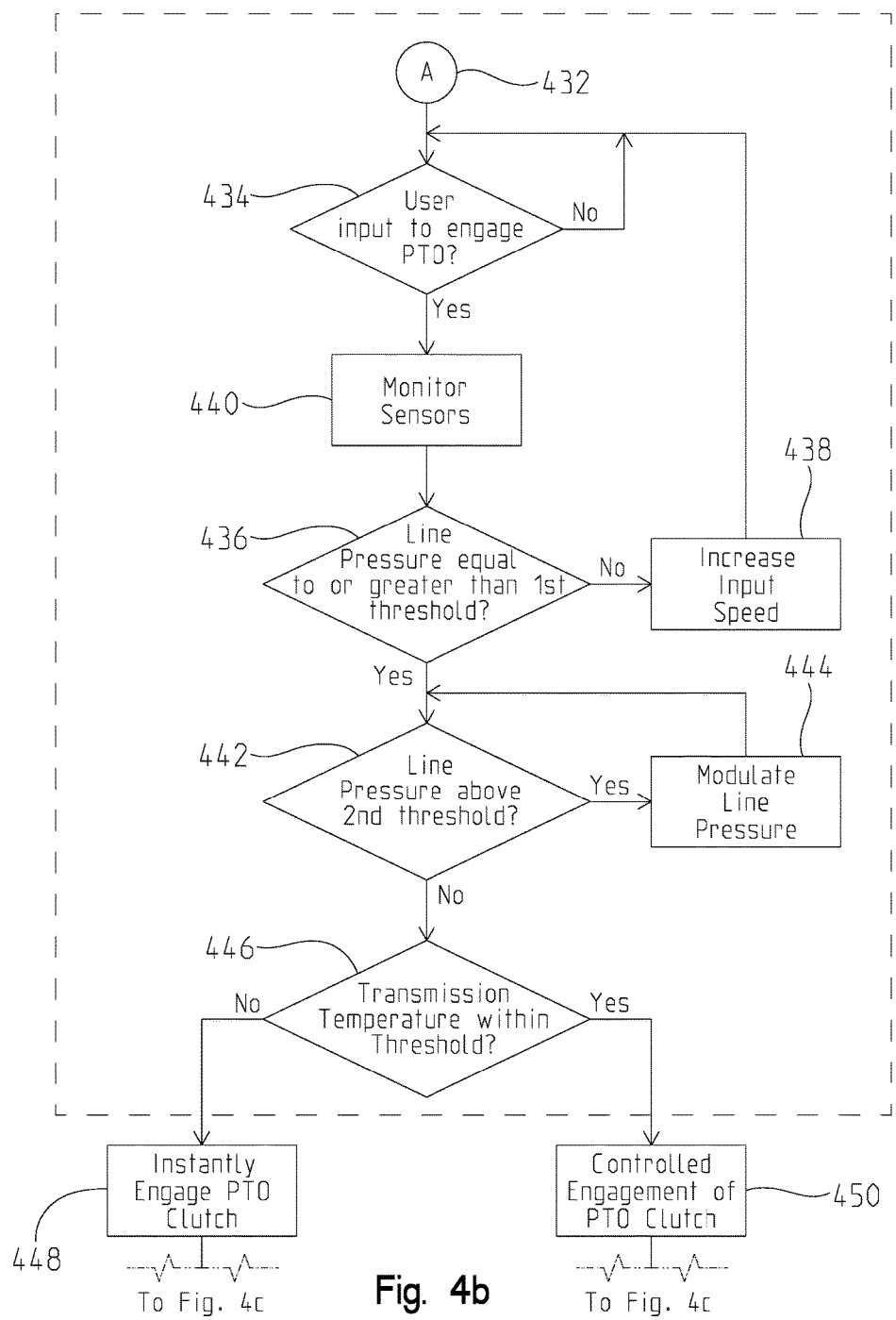

Further, while the control algorithm 432 is shown sequentially in FIG. 4b, this disclosure is not limited to the specific sequence shown and described. Rather, the sequence of the control algorithm 432 can be arranged in many different orders. Accordingly, this disclosure is not limited to the order in which steps are shown and described herein but rather considers any number of orders for each step. Further still, there may be no order at all. In one embodiment the controller 424 may be performing all monitoring and controlling functions at substantially the same time.

In one embodiment, the controller 424 may monitor the user input 418 to determine whether the user input 418 is in an engaged position or a disengaged position (not particularly shown) as indicated by block 434. At this point, if the user input 418 is in the disengage position, the controller 424 determines that the PTO clutch assembly 200, 300 should be in the disengaged position and sends signals to the PTO clutch 428 and/or the transmission 430 to orient the PTO clutch assembly 200, 300 in the disengaged position. The controller 424 may continuously monitor the user input 418 and not progress to block 440 until the user input 418 is in the engaged position.

While monitoring the user input 418 is described in block 434, another embodiment may not monitor a user input 418 at all. Rather, the controller 424 may determine whether the PTO clutch assembly 200, 300 should be engaged based on the readings from the plurality of sensors. In this embodiment, the controller 424 may automatically engage or disengage the PTO clutch assembly 200, 300 when predefined thresholds are met by the plurality of sensors. In one non-exclusive example, the controller 424 may only engage the PTO clutch assembly 200, 300 when the transmission range sensor 402 indicates the vehicle is in a parked transmission configuration. In yet another embodiment, the controller 424 may only engage the PTO clutch assembly 200, 300 when the outrigger sensor 422 indicates one or more outriggers are deployed. The controller 424 can monitor any number of sensors to determine when to engage the PTO clutch assembly 200, 300 and this disclosure is not limited to exclusively monitoring any particular set of sensors.

In the embodiment of FIG. 4b, once the controller 424 identifies the user input 418 is in the engaged position, the controller 424 may perform a basic thresholds check in block 440. The thresholds check of 440 may be directed to threshold values for specific sensors. In one embodiment, block 440 may determine whether a Diagnostic Trouble Code (DTC) sensor 410 indicates a DTC is present. If the controller 424 identifies a DTC is present, the controller 424 may not engage the PTO clutch assembly 200, 300. The DTC could indicate any of a plurality of issues with the transmission 430, the engine 426, or the PTO clutch 428. In one non-exclusive example, the DTC could indicate that the PTO clutch 428 is stuck in an engaged or disengaged position. In a different embodiment, a DTC may indicate that a hydraulic system of the transmission 430 is not functioning properly. A DTC could indicate any number of issues with the vehicle system and this disclosure is not limited to any specific DTC.

Another basic threshold check of block 440 may be the controller 424 monitoring the transmission range sensor 402 to determine whether the transmission range sensor 402 is indicating a transmission range within a transmission range threshold. In one nonexclusive example, the controller 424 may only engage the PTO clutch 428 when the transmission range sensor 402 indicates the transmission range is in a "Park" range. In this embodiment, if the transmission range sensor 402 does not indicate to the controller 424 that the transmission is in the "Park" range the controller 424 may not allow the PTO clutch assembly 200, 300 to become positioned in the engaged position.

In yet another embodiment of block 440, the outrigger sensor 422 may be compared to an outrigger threshold by the controller 424 before the PTO clutch assembly 200, 300 may be engaged. In this embodiment, the outrigger threshold may be programmed into the controller 424 to indicate whether outriggers are engaged with the surrounding surface. In this embodiment, if the outriggers are not engaged with the surrounding surface, the outrigger sensor 422 will not indicate to the controller 424 that the outrigger threshold requirement is met. Accordingly, the controller 424 may not engage the PTO clutch assembly 200, 300 even if the user input 418 is in the engaged position.

Block 440 could incorporate many different sensors being monitored by the controller 424 and compared to a threshold. In one example, the controller 424 can compare many different types of sensors to thresholds as a safety feature prior to engaging the PTO clutch assembly 200, 300. In addition to the above embodiments of sensors monitored in block 440, proximity sensors, weight sensors, motion sensors, and any other type of sensor may be monitored by the controller 424 prior to engaging the PTO clutch assembly 200, 300. Accordingly, this disclosure is not limited to the particular sensors described above for block 440 but rather considers utilizing any type of sensor that may be compared to a threshold by the controller 424 prior to engaging the PTO clutch assembly 200, 300.

Referring now to block 436, the controller 424 may monitor the line pressure sensor 416 after the controller 424 determines the user input 418 is in the engaged position and all of the threshold conditions of block 440 are satisfied. More specifically, the controller 424 may monitor the line pressure sensor 416 to determine if the line pressure sensor 416 indicates a line pressure greater than a lower line pressure threshold that has been programmed into the controller 424 or otherwise determined. The lower line pressure threshold may be a line pressure that would be a minimum pressure to properly engage the PTO clutch assembly 200, 300. In one embodiment, if the line pressure is below the lower line pressure threshold, the controller 424 may send a signal to the solenoid controlling the line pressure, where the signal in indicative of a request for greater line pressure. In this manner, the controller 424 can modulate line pressure via its communication with the solenoid.

In another embodiment, if the line pressure is below the lower line pressure threshold, the controller 424 may execute block 438 to increase the speed of the engine 426, and thereby increase the line pressure until the line pressure is greater than the lower line pressure threshold or a maximum engine speed threshold is met. In a different embodiment, if the line pressure is below the lower line pressure threshold, and cannot be achieved through one of the previously described methods, the controller 424 may determine the current conditions are such that it cannot engage the PTO clutch assembly 200, 300.

Similarly, in block 442 the controller 424 may monitor the line pressure sensor 416 to determine whether the line pressure is above a pre-programmed upper line pressure threshold. The upper line pressure threshold may be a pressure that adequately engages the PTO clutch assembly 200, 300. Accordingly, any line pressure above the upper line pressure threshold would be an unnecessary burden on the hydraulic system. In this embodiment, if the controller 424 identifies that the line pressure is greater than the upper line pressure threshold, the controller 424 modulates the line pressure in block 444 until the line pressure is less than or equal to the upper line pressure threshold. In one embodiment, the controller 424 may modulate the line pressure by adjusting a proportional valve. However, the controller 424 could also control the line pressure through decreasing engine speed will reduce the pump output flow and decrease the line pressure. and this disclosure is not limited to any one method of modulating the line pressure.

While monitoring the line pressure for both low and high pressures has been described in detail herein, one embodiment may not monitor the line pressure at all. In this non-exclusive embodiment, the controller 424 may assume proper line pressure and skip blocks 436 and 442.

In one non-limiting example the line pressure sensor 416 may be monitored by the controller 424 to ensure that the PTO clutch assembly 200, 300 is not damaged. More specifically, the line pressure sensor 416 may indicate the hydraulic pressure provided to the piston 342, 240 and further applied to the PTO clutch assembly 200, 300. Insufficient hydraulic pressure may cause the PTO clutch assembly 200, 300 to only partially engage, causing over-heating of the clutch inadequate line pressure resulting in clutch slip can also result in damage to the connected PTO device due to improper input speed or operating torque of the plurality of plates. Further, it may be inefficient and unnecessary for the line pressure to be above the upper line pressure.

The controller 424 may also monitor the transmission temperature sensor 412 in block 446. The transmission temperature sensor 412 may indicate to the controller 424 a transmission temperature, i.e., the temperature of the hydraulic fluid disposed within the transmission 430. In one embodiment, a transmission temperature threshold may be stored in the controller 424. In this embodiment, the controller 424 may compare readings from the transmission temperature sensor 412 with the transmission temperature threshold. In another embodiment, if temperature is outside of the temperature threshold, the controller 424 may interpret or determine this condition and not allow any engagement. For example, if the temperature is below a threshold, the controller 424 may determine that the system is not up to normal operating temperature. Alternatively, if the temperature is too high (e.g., above a threshold), the controller 424 may determine that there is another concern with the transmission and not allow PTO operation. In another aspect, however, if the controller 424 determines the transmission temperature to be within the transmission temperature threshold, the controller 424 may execute a controlled engagement of the PTO clutch assembly 200, 300 as indicated by block 450.

The controlled engagement of block 450 may be executed by the controller 424 by gradually opening a clutch valve of the transmission 430 that provides hydraulic fluid and pressure to the PTO clutch assembly 200, 300. The controlled engagement of the PTO clutch assembly 200, 300 may allow the PTO gear 210, 310 to transition from a stationary state relative to the PTO shaft 208 (clutch disengaged) to a rotationally coupled state where the PTO gear 210, 310 rotates at substantially the same speed as the PTO shaft 208 (clutch engaged).

Once the PTO clutch assembly 200, 300 is engaged via either block 448 or block 450, the controller 424 may initiate a post engagement sequence 452. During the post-engagement sequence 452, the controller 424 may monitor the PTO output speed sensor 408 to determine a rotational PTO speed. Further, the controller 424 may monitor the engine speed sensor 406 to determine a rotational engine speed. In block 454, the controller may compare the engine speed to the PTO speed. More specifically, because the PTO clutch assembly 200, 300 should be engaged and therefore rotationally coupled to the PTO shaft 208, the PTO speed and the engine speed should be substantially the same speed.

If the controller 424 determines that the PTO speed is less than the engine speed by a threshold amount, the controller 424 may execute block 456 to increase the line pressure of the system. The controller 424 may increase the line pressure of the system by further opening the valve, or any other similar hydraulic control mechanism, to provide an increased line pressure. The controller 424 may continuously monitor the PTO speed and the engine speed as the valve is further opened in block 456. Further, the controller 424 may continue to open the valve until the PTO speed is within a threshold of the engine speed or until the line pressure is no longer reduced compared to the hydraulic system (i.e. the valve is fully opened).

If the PTO speed becomes about equal to the engine speed in block 458, the controller 424 will loop back to block 454 and continue to compare the PTO speed to the engine speed. If the valve is fully opened and the PTO speed is not about equal to the engine speed in block 458, the controller 424 may increase the engine speed of the engine 426 as shown by block 460. In one embodiment, by increasing the speed of the engine 426, the controller 424 may increase pump flow, and therefore, the overall available line pressure. More specifically, the hydraulic pump 120 may be powered by the engine 426. As the engine speed is increased, the hydraulic pump 120 may provide a greater hydraulic flow to the hydraulic system, thereby increasing the line pressure as the engine speed is increased.

The engine speed may be increased until an engine speed threshold is met. The engine speed threshold may be programmed into the controller 424 to limit the maximum engine speed. More specifically, as the controller increases the engine speed in block 460 to increase the line pressure, the controller 424 may stop increasing the engine speed when the engine speed is equal to the engine speed threshold. Further, the controller 424 may continuously compare the engine speed to the PTO speed as the engine speed is increased as indicated by block 462. If the PTO speed becomes about the same as the engine speed, the controller 424 may maintain the engine speed and return to block 454.

However, if the controller 424 increases the engine speed to the engine speed threshold at block 464 and the PTO speed is not about the same as the engine speed, the controller 424 may disengage the PTO clutch assembly 200, 300 at block 466. More specifically, at block 464 the valve may be fully opened and the engine speed may be at the engine speed threshold, thereby providing the highest available line pressure for the system. If the PTO speed is not about the same as the engine speed at block 464, the controller 424 may determine that the PTO clutch assembly 200, 300 is slipping and that the PTO clutch assembly 200, 300 will be damaged if it is held in the engaged position. Block 466 may also send a DTC to the controller 424 indicating an issue and/or can send a signal to the user that the PTO clutch assembly 200, 300 is not functioning properly. The signal sent to the user could be any known audible or visual signal.

In another embodiment, the controller 424 may constantly compare the engine speed to the engine speed threshold to determine whether an over-speed condition exists. More specifically, if the controller 424 determines the engine speed is greater than the engine speed threshold, the controller 424 may disengage the PTO clutch assembly 200, 300 to prevent a PTO driven assembly damage.

While the post-engagement sequence 452 has been described herein as happening after a signal to engage the PTO clutch 428 has been transmitted, the controller 424 may compare substantially all of the sensors described in FIG. 4b to their respective thresholds simultaneously. Further still, no particular order of executing the method described above is limiting. Rather, any sequence of monitoring and comparing the sensors discussed is considered herein.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of selectively controlling a power take-off (PTO) assembly, comprising:
    positioning a clutch assembly radially between a shaft and a PTO gear;
    operably controlling the clutch assembly with a controller;
    selectively engaging the clutch assembly with the controller;
    wherein the selectively engaging the clutch assembly step comprises:
        monitoring, by the controller, signals received from a plurality of sensors;
        comparing, by the controller, the monitored signals with respective signal thresholds; and
        engaging the clutch assembly when the compared monitored signals are within the signal thresholds;
    further wherein, the monitoring signals received from the plurality of sensors step comprises monitoring, by the controller, an engine speed sensor, a user input sensor, and a PTO output speed sensor.

2. The method of claim 1, further wherein the monitoring signals received from the plurality of sensors step comprises monitoring, by the controller, a transmission range sensor, a vehicle speed sensor, a code sensor, a transmission temperature sensor, a vehicle grade sensor, and a line pressure sensor.

3. The method of claim 1, further comprising:
    comparing, by the controller, a user input signal generated by the user input to a user input threshold;
    wherein, when the user input signal is within the user input threshold, the PTO clutch assembly is engaged;
    wherein, when the user input signal is not within the user input threshold, the PTO clutch assembly is not engaged.

4. The method of claim 1, further comprising comparing, by the controller, an engine speed indicated by the engine speed sensor to a PTO speed indicated by the PTO output speed sensor when the clutch assembly is in the engaged position, wherein the controller selectively disengages the clutch when the PTO speed is not within a threshold range relative to the engine speed.

5. The method of claim 1, further wherein the controller does not engage the clutch assembly when a vehicle speed sensor indicates the vehicle speed within a vehicle speed range.

6. A method of controlling a power take-off (PTO) assembly of a transmission, comprising:
    providing a user input, an engine, the transmission including a shaft, a hydraulic system, and fluid within the hydraulic system having a line pressure, a controller including a memory unit and a processor, and the PTO assembly including a PTO gear, a PTO output sensor, and a clutch assembly positioned between the PTO gear and the shaft;
    determining, by the controller, when a user input has been received;
    comparing, by the controller, the line pressure of the fluid to a pressure threshold stored in the memory after the user input has been received;
    engaging the clutch assembly, by the controller, when the line pressure is above the pressure threshold;
    detecting PTO speed with the PTO output sensor; and
    comparing, by the controller, an engine speed of the engine to the PTO speed when the clutch assembly is engaged;
    wherein, if a difference between engine speed and PTO speed is not within a predefined speed threshold value, the controller increases the line pressure.

7. The method of claim 6, further comprising increasing engine speed if the line pressure is below the pressure threshold.

8. The method of claim 6, wherein the engaging the clutch assembly step comprises opening a valve of the transmission.

9. The method of claim 6, further wherein the controller compares the line pressure to a second pressure threshold stored in the memory, wherein when the line pressure is greater than the second pressure threshold, the controller modulates the valve in the transmission until the line pressure is less than the second pressure threshold.

10. The method of claim 6, further comprising increasing the engine speed, by the controller, when clutch assembly is in the engaged position and the PTO speed is less than a PTO threshold.

11. The method of claim 6, further wherein:
    the controller compares the engine speed to an engine speed threshold stored in the memory of the controller; and
    the controller disengages the clutch assembly if the monitored engine speed is greater than the engine speed threshold.

12. A method for controlling a power take-off (PTO) assembly of a transmission, comprising:
    providing a controller, a user input, a pressure sensor, a valve, a shaft speed sensor, and the PTO assembly including a PTO gear, a PTO speed sensor and a clutch assembly disposed radially between the PTO gear and a shaft of the transmission;
    receiving, with the controller, a command from the user input indicating a desired engagement of the clutch assembly;
    comparing a line pressure detected by the pressure sensor to a pressure threshold stored in the controller;
    controlling the valve, with the controller, to restrict the clutch assembly from engaging the PTO gear when the line pressure is less than the pressure threshold;
    comparing a PTO speed measured by the PTO speed sensor to a shaft speed measured by the shaft speed sensor with the controller when the clutch assembly is in an engaged position; and
    disengaging the clutch, with the controller, when the comparing a PTO speed step indicates the PTO speed is not substantially the same as the shaft speed.

13. The method for controlling a clutch assembly of claim 12, further comprising controlling, with the controller, an input speed and increasing the input speed when the line pressure is less than the pressure threshold and the input speed is less than an input speed threshold.

14. The method of controlling a clutch assembly of claim 12, further comprising increasing the line pressure when the shaft speed is greater than the PTO speed.

15. The method of controlling a clutch assembly of claim 12, further comprising reducing the line pressure when the line pressure is above a second pressure threshold.

16. The method of controlling a clutch assembly of claim 12, further comprising restricting the clutch assembly from engaging unless a transmission range selector is within a transmission range threshold.

17. The method of controlling a clutch assembly of claim 12, further comprising:
providing a vehicle grade sensor that communicates the grade of the vehicle to the controller; and
restricting the clutch assembly from engaging when a vehicle grade sensor value is not within a vehicle grade threshold.

18. The method of controlling a clutch assembly of claim 12, further comprising:
monitoring a transmission temperature;
providing an instantaneous full line pressure to engage the clutch assembly when the transmission temperature satisfies a temperature threshold; and
providing a gradual increase to line pressure to engage the clutch assembly when the transmission temperatures does not satisfy the temperature threshold.

19. The method of controlling a clutch assembly of claim 12, further comprising:
monitoring an outrigger; and
engaging the clutch assembly only when the outrigger is in an extended position.

20. A method of selectively controlling a power take-off (PTO) assembly, comprising:
positioning a clutch assembly radially between a shaft and a PTO gear;
operably controlling the clutch assembly with a controller;
selectively engaging the clutch assembly with the controller;
wherein the selectively engaging the clutch assembly step comprises:
monitoring, by the controller, signals received from a plurality of sensors;
comparing, by the controller, the monitored signals with respective signal thresholds; and
engaging the clutch assembly when the compared monitored signals are within the signal thresholds;
further wherein, the controller does not engage the clutch assembly when a vehicle speed sensor indicates the vehicle speed is within a vehicle speed range.

* * * * *